United States Patent
Samukawa et al.

(10) Patent No.: US 7,650,239 B2
(45) Date of Patent: Jan. 19, 2010

(54) OBJECT RECOGNITION APPARATUS FOR MOTOR VEHICLE

(75) Inventors: Yoshie Samukawa, Kariya (JP); Yoshiaki Hoashi, Kariya (JP); Mamoru Shimamoto, Nagoya (JP); Keiji Matsuoka, Obu (JP)

(73) Assignee: Denso Corporation, Kariya (JP)

( * ) Notice: Subject to any disclaimer, the term of this patent is extended or adjusted under 35 U.S.C. 154(b) by 851 days.

(21) Appl. No.: 11/273,340

(22) Filed: Nov. 14, 2005

(65) Prior Publication Data

US 2006/0103927 A1    May 18, 2006

(30) Foreign Application Priority Data

Nov. 16, 2004    (JP) ............................. 2004-332401

(51) Int. Cl.
G05D 1/02    (2006.01)
(52) U.S. Cl. ........................... 701/300; 701/45; 342/70; 342/118; 342/71; 342/85; 340/435; 340/903; 180/169; 356/28
(58) Field of Classification Search ............ 342/70, 342/165, 173–174, 118; 359/436; 356/4.01, 356/28; 250/222.1; 701/300–301, 96; 340/903; 367/99
See application file for complete search history.

(56) References Cited

U.S. PATENT DOCUMENTS 6,025,797 A * 2/2000 Kawai et al. ................. 342/70
6,473,079 B1 * 10/2002 Kacyra et al. ............... 345/419
6,512,518 B2 * 1/2003 Dimsdale .................... 345/427

(Continued)

FOREIGN PATENT DOCUMENTS

JP    9-195916    * 7/1997

(Continued)

OTHER PUBLICATIONS

Use of Deeply Integrated GPS/INS Architecture and Laser Scanners for the Identification of Multipath Reflections in Urban Environments; Soloviev, A.; Van Graas, F.; Selected Topics in Signal Processing, IEEE Journal of, vol. 3, Issue 5, Oct. 2009 pp. 786-797, Digital Object Identifier 10.1109/JSTSP.2009.2027796.*

(Continued)

*Primary Examiner*—Cuong H Nguyen
(74) *Attorney, Agent, or Firm*—Harness, Dickey & Pierce, PLC (57) ABSTRACT

An object recognition apparatus in a subject vehicle includes a radar unit for transmitting a plurality of laser beams in a scan range spread in horizontal and vertical directions of the subject vehicle and receiving a reflection, a recognition unit for recognizing the object in front of the subject vehicle based on the reflection, a determination sub-unit in the radar unit, a calculation sub-unit in the radar unit; and an adjustment sub-unit in the radar unit. The radar unit is so disposed in the subject vehicle with a center axis of one of the plurality of the laser beams aligned with a target angle that the determination sub-unit uses coverage in the vertical direction of the laser beam being sufficient for variation of heights of the reflector on the object at a first distance detected by the radar unit as the predetermined condition for selecting of the object.

9 Claims, 6 Drawing Sheets

U.S. PATENT DOCUMENTS

| | | | |
|---|---|---|---|
| 6,583,752 B2 * | 6/2003 | Samukawa et al. | 342/70 |
| 6,810,330 B2 * | 10/2004 | Matsuura | 701/301 |
| 6,847,462 B1 * | 1/2005 | Kacyra et al. | 356/601 |
| 6,927,699 B2 * | 8/2005 | Samukawa et al. | 340/903 |
| 6,941,216 B2 * | 9/2005 | Isogai et al. | 701/96 |
| 6,956,227 B2 * | 10/2005 | Miyazaki et al. | 250/559.38 |
| 7,136,753 B2 * | 11/2006 | Samukawa et al. | 701/301 |
| 7,184,036 B2 * | 2/2007 | Dimsdale et al. | 345/419 |
| 7,283,212 B2 * | 10/2007 | Arita et al. | 356/5.01 |
| 7,496,449 B2 * | 2/2009 | Samukawa et al. | 701/301 |
| 2001/0020201 A1 * | 9/2001 | Shirai et al. | 701/1 |
| 2002/0003489 A1 * | 1/2002 | Samukawa et al. | 342/70 |
| 2003/0217880 A1 * | 11/2003 | Isogai et al. | 180/170 |
| 2004/0065814 A1 * | 4/2004 | Miyazaki et al. | 250/222.1 |
| 2004/0117090 A1 * | 6/2004 | Samukawa et al. | 701/45 |
| 2005/0093735 A1 * | 5/2005 | Samukawa et al. | 342/70 |

FOREIGN PATENT DOCUMENTS

| | | | |
|---|---|---|---|
| JP | 2002-354215 | * | 12/2002 |
| JP | 2002-354216 | * | 12/2002 |
| JP | 2002-354217 | * | 12/2002 |
| JP | 2002-368903 | * | 12/2002 |
| JP | 2002-368904 | * | 12/2002 |

OTHER PUBLICATIONS

Extrinsic self calibration of a camera and a 3D laser range finder from natural scenes; Scaramuzza, Davide; Harati, Ahad; Siegwart, Roland; Intelligent Robots and Systems, 2007. IROS 2007. IEEE/RSJ International Conference on; Oct. 29, 2007-Nov. 2, 2007 pp. 4164-4169; Digital Object Identifier 10.1109/IROS.2007.4399276.*

Utilizing multipath reflections in deeply integrated GPS/INS architecture for navigation in urban environments; Soloviev, A.; van Graas, F.; Position, Location and Navigation Symposium, 2008 IEEE/ION; May 5-8, 2008 pp. 383-393, Digital Object Identifier 10.1109/PLANS.2008.4570094.*

The Accuracy of 6D SLAM using the AIS 3D Laser Scanner; Muller, M.; Surmann, H.; Pervolz, K.; May, S.; Multisensor Fusion and Integration for Intelligent Systems, 2006 IEEE International Conference on; Sep. 2006 pp. 389-394; Digital Object Identifier 10.1109/MFI.2006.265647.*

Construction and realization of a 3D perceptual system based on 2D laser radar; Mingchen Gao; Weihai Chen; Bing Li; Tao Lv; Industrial Electronics and Applications, 2008. ICIEA 2008. 3rd IEEE Conference on; Jun. 3-5, 2008 pp. 680-684 Digital Object Identifier 10.1109/ICIEA.2008.4582601.*

3-D mapping of natural environments with trees by means of mobile perception; Forsman, P.; Halme, A.; Robotics, IEEE Transactions on [see also Robotics and Automation, IEEE Transactions on]; vol. 21, Issue 3, Jun. 2005 pp. 482-490 Digital Object Identifier 10.1109/TRO.2004.838003.*

* cited by examiner

OBJECT RECOGNITION APPARATUS FOR MOTOR VEHICLE

CROSS REFERENCE TO RELATED APPLICATION

This application is based on and claims the benefit of priority of Japanese Patent Application No. 2004-332401 filed on Nov. 16, 2004, the disclosure of which is incorporated herein by reference.

FIELD OF THE INVENTION

The present invention generally relates to a vehicle object recognition apparatus which is designed to emit or radiate transmission waves throughout a predetermined angular range in each of vertical (vehicle-height) and horizontal (vehicle-width, lateral) directions from one vehicle to recognize an object in front of the vehicle on the basis of reflected waves thereof, and further to an inter-vehicle control unit.

BACKGROUND OF THE INVENTION

So far, for example, as disclosed in Japanese Patent Laid-Open No. 2004-184331, there has been an object recognition apparatus designed to emit an optical wave such as a laser beam to detect a reflected wave for recognizing an object existing in a forward direction. Such an apparatus is, for example, applicable to an apparatus made to detect a vehicle in a forward direction and issue an alarm, an apparatus made to control a vehicle speed for keeping a predetermined distance (inter-vehicle distance) between a subject vehicle and the vehicle ahead, or the like. That is, it has been incorporated into applications involving the recognition of a vehicle existing a forward direction.

The aforesaid object recognition apparatus is designed to emit a plurality of transmission waves (laser beams) forwardly toward a target in a predetermined position relative to the subject vehicle, and to determine a laser beam having a strongest intensity among the reflected laser beams in each of horizontal (X axis) and vertical (Y axis) directions. The laser beams having the strongest intensity is used as the center of X axis and Y axis of a recognition area used for recognizing an object in front of the subject vehicle. That is, the recognition area is defined as an area within a predetermined angle relative to the center of X axis and Y axis.

The object recognition apparatus uses the recognition area defined in the above-described manner for scanning the object in order to have a greater disposition tolerance angle when the apparatus is disposed on the subject vehicle. In this manner, the object recognition apparatus can emit the laser beam in an appropriate direction for recognizing the object in front of the subject vehicle.

In addition, the object recognition apparatus determines a vertical axis adjustment angle based on the intensity of the two laser beams that sandwiches a strongest laser beam defined as the center of the Y axis in the above-described manner. That is, the vertical axis adjustment angle is a deviation angle of an axis of the center laser beam from a reference angle in the vertical (Y axis) direction. The axis of the center laser beam may deviate from a direction defined by the reference angle because of the relatively wide angle of the laser beam in the vertical (Y axis) direction. The vertical axis adjustment angle is used to determine whether the radar unit of the object recognition apparatus is disposed in an upwardly deviated manner, or in a downwardly deviated manner relative to the reference angle.

However, an actual range of angle of the laser beam, that is, the angle of the axis of the center laser beam is affected by various factors even when the recognition area and the vertical axis adjustment angle are determined in the above-described manner. For example, the actual range of angle of the laser beam radiated from the radar unit may be diverted from the recognition area especially in the vertical (Y axis) direction when the subject vehicle has a heavy load and/or occupants loaded therein.

In this case, the object recognition apparatus disclosed in Japanese Patent Laid-Open No. 2004-184331 uses a reflector disposed on a back surface of a vehicle to have a reflected laser beam for detecting the deviation angle (the vertical axis adjustment angle) of the axis of the laser beam from the reference angle. The deviation angle, i.e., the vertical axis adjustment angle is used to adjust a disposition angle of the radar unit. In this manner, the direction of the laser beam radiated from the radar unit is accurately determined whether it is deviated upward or downward from the reference angle.

The height of the reflector on the back surface of a vehicle varies according to a type of the vehicle, and the height of the reflector greatly differs between a passenger type vehicle and a truck type vehicle. The object recognition apparatus described above is designed to detect the deviation angle from the reference angle only by using the reflected laser beam from the passenger type vehicle because the variation of the reflector height among passenger type vehicles is relatively small. That is, the deviation angle is determined only by using the reflected laser beam from a vehicle that is determined as the passenger type vehicle based on the width of the vehicle.

The deviation angle can accurately be calculated and determined in the above-described manner at the sacrifice of occasions for determining the deviation angle by using the reflected laser beam from the truck type vehicle. In other words, change in the deviation angle because of the heavy load and/or occupants cannot be detected while, for example, the subject vehicle is traveling behind the truck type vehicle.

SUMMARY OF THE INVENTION

In view of the above-described and other problems, the present invention provides a vehicle object recognition apparatus that accommodates various types of vehicles in detecting and determining a deviation angle of an axis of a laser beam radiated from a radar unit installed therein.

The vehicle object recognition apparatus of the present invention includes a radar unit for detecting an object by transmitting and receiving a laser beam, and a recognition device for recognizing an object that reflected the laser beam. The radar unit radiates a plurality of laser beams in each of vertical and horizontal directions, i.e., in each of width and height directions of the vehicle, within a predetermined range of angle. The recognition device recognizes the object based on a transmission and reception result of the laser beam. The radar unit is disposed in the vehicle in a manner that a vertical center axis of a scanning range of the laser beam is aligned with a reference angle. The radar unit further includes a determination device, a calculation device and an adjustment device. The determination device determines a position of each of laser beams originally radiated from the radar unit based on a reflection of each of the original laser beams reflected on a reflector of a forward vehicle. The calculation device calculates the deviation angle of the axis of the laser beam from the reference angle based on a plurality of determination results of the positions of the original laser beam. The adjustment device adjusts one of a radiation angle range in the vertical direction (in a height direction of the radar unit)

by using the deviation angle and a process for recognizing the object that reflects the laser beam. The determination device determines the position of each of the laser beams radiated from the radar unit on condition that the distance from the radar unit to the reflector is sufficient for inclusively covering dispersion of disposition heights of the reflectors by the laser beam radiated therefrom.

The object recognition apparatus determines the position of each of the laser beams radiated from the radar unit when dispersed reflector's heights of the forward vehicles is effectively covered by each of the laser beams radiated from the subject vehicle. In this manner, the laser beam radiated in a specific direction effectively covers reflectors on forward vehicles disposed at heights in a certain range. Therefore, the deviation angle of the axis of the laser beam from the reference angle in the vertical direction is accurately determined based on a position of a specific radiation of the laser beam when the axis of the laser beam represents a whole coverage of the radar unit in the vertical direction.

According to one aspect of the present invention, the determination device conditionally detects the forward vehicle in a distance that makes the vertical coverage of each of the laser beams adequately include the deviated heights of the reflectors disposed on the forward vehicles. In this manner, variations of the heights of the reflectors can be accommodated by each of the laser beams in a specific direction radiated from the radar unit in terms of detection of the forward vehicle.

According to another aspect of the present invention, the calculation device calculates an average of a predetermined number of positions of the laser beam being determined by the determination device, determines the deviation angle of the averaged position from the reference angle, and discards the data of the predetermined number of positions used to calculate the averaged position. In this manner, the deviation angle can accurately be determined even when some of the positions of the laser beam are erroneous because of the environmental disturbance such as an uneven road or the like. Further, the deviation angle accurately reflects the current traveling condition of the vehicle based on the updated position data.

According to yet another aspect of the present invention, adjacent laser beams in the vertical direction overlap each other on their edges. An average of radiation angles of two adjacent laser beams is determined as the position of the laser beam when reflections of the two adjacent beams are received. In this manner, the position of the laser beam in the vertical direction is accurately determined.

According to still yet another aspect of the present invention, non-overlapping portion of the laser beam is used to generate reflection on the reflector of the forward vehicle. In this manner, the deviation angle of the vertical center axis of the scanning range of the radar unit away from the reference angle is accurately determined.

According to still yet another aspect of the present invention, the determination device determines the position of the laser beam based on a speed detected by a speed detector. A condition of a vehicle traveling at a speed greater than a certain value indicates that the vehicle is presumably traveling on a relatively flat road. In this manner, the deviation angle can accurately be determined under a circumstance that the subject vehicle and the forward vehicle are both traveling on a substantially flat road.

According to still yet another aspect of the present invention, the determination device determines the position of the laser beam based on an acceleration detected by an acceleration sensor. A condition of a vehicle traveling at an acceleration greater than a certain value indicates that vehicle attitude is either "squatting" (nose-lifting) or "nose-diving" because of the positive or negative acceleration. Therefore, determination of the deviation angle during acceleration is preferably prevented.

According to still yet another aspect of the present invention, the determination device determines the position of the laser beam based on a curvature detected by a curvature detector. A condition of a vehicle traveling along a road that has a curvature greater than a certain value indicates that the subject vehicle and the forward vehicle are traveling on a substantially straight road. In this manner, erroneous detection of the position of the laser beam because of the roll of the vehicle is prevented. Further, the forward vehicle can not be captured on a curved road.

According to still yet another aspect of the present invention, the radar unit is determined to be out of alignment when the vertical center axis of the scanning range is not positioned within a predetermined range of angle. In other words, the radar unit is disposed upwardly or downwardly mal-aligned away from a reference angle. In this case, the laser beam from the downwardly mal-aligned radar unit may mistakenly detect reflections from delineators, e.g., cats-eyes, on a road as the reflection from the reflector of the forward vehicle. The laser beam from the upwardly mal-aligned radar unit may mistakenly detect reflections from road signs as the reflection from the reflector of the forward vehicle. Therefore, the probability of detection of the forward vehicle based on the laser beam vertically above or below the laser beam that includes the vertical center axis of the scanning range is decreased in order not to mistakenly recognize non-vehicle object as the forward vehicle.

According to still yet another aspect of the present invention, the laser beam radiated from the radar unit can be adjusted in a range of angle that is greater than the scanning range of the laser beam. The scanning range of the laser beam is adjusted by the adjustment device when the deviation angle calculated by the calculation means is greater than the predetermined range of angle. In this manner, the axis of the laser beam radiated from the radar unit can be appropriately aligned with the reference angle in the vertical direction.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Details of an embodiment of an object recognition apparatus used in a vehicle controller 1 are described with reference to the drawings. The vehicle controller 1 is disposed in a vehicle for controlling an alarm for an obstacle and/or a speed of the vehicle according to a forward vehicle.

Figure 1:
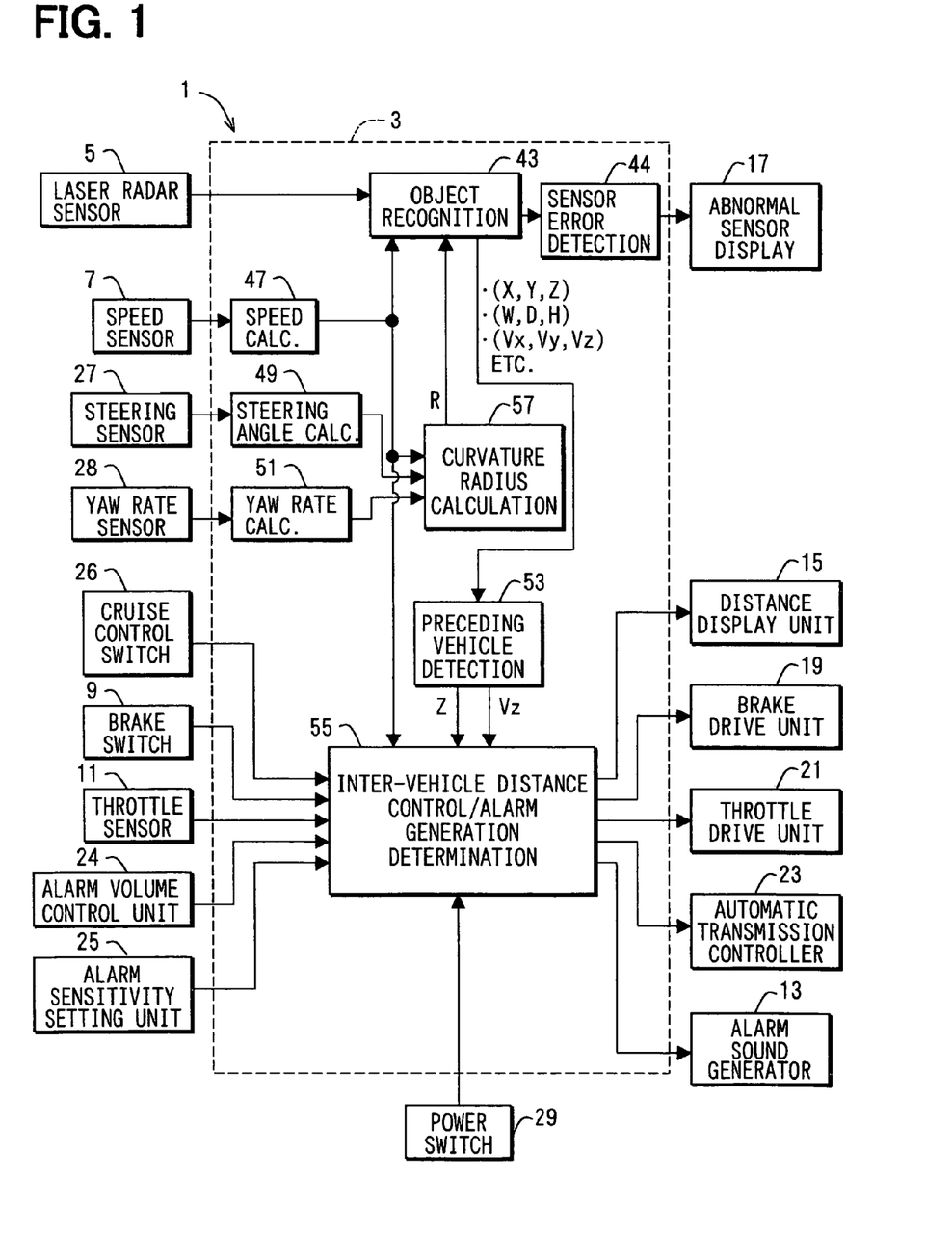
FIG. 1 shows a block diagram of an object recognition apparatus for a vehicle in a first embodiment of the present invention.

FIG. 1 shows a block diagram of the vehicle controller 1. The vehicle controller 1 includes a recognition and vehicle distance control ECU 3 and other devices. The recognition and vehicle distance control ECU 3 is composed of a microcomputer, and includes an input/output interface (I/O), various drive circuits and detector circuits. Those hardware construction is known and hence not described here in detail.

The recognition and vehicle distance control ECU 3 receives detection signals from a laser radar sensor 5 which is a vehicle radar device, a vehicle speed sensor 7, a brake switch 9 and a throttle opening sensor 11, and sends drive signals to an alarm sound generator 13, a distance display unit 15, an abnormal sensor display 17, a brake drive unit 19, a throttle drive unit 21 and to an automatic transmission (A/T) controller 23. To the recognition and vehicle distance control ECU 3, further, there are connected an alarm volume control unit 24 for setting the volume of alarm sound, an alarm sensitivity setting unit 25 for setting the sensitivity in the alarm determination processing, a cruise control switch 26, a steering sensor 27 for detecting the amount of operating a steering wheel that is not shown, and a yaw rate sensor 28 for detecting the yaw rate occurring in the vehicle. The recognition and vehicle distance control ECU 3 further includes a power source switch 29, and starts executing predetermined processing upon the turn-on of the power source switch 29.

Figure 2A:
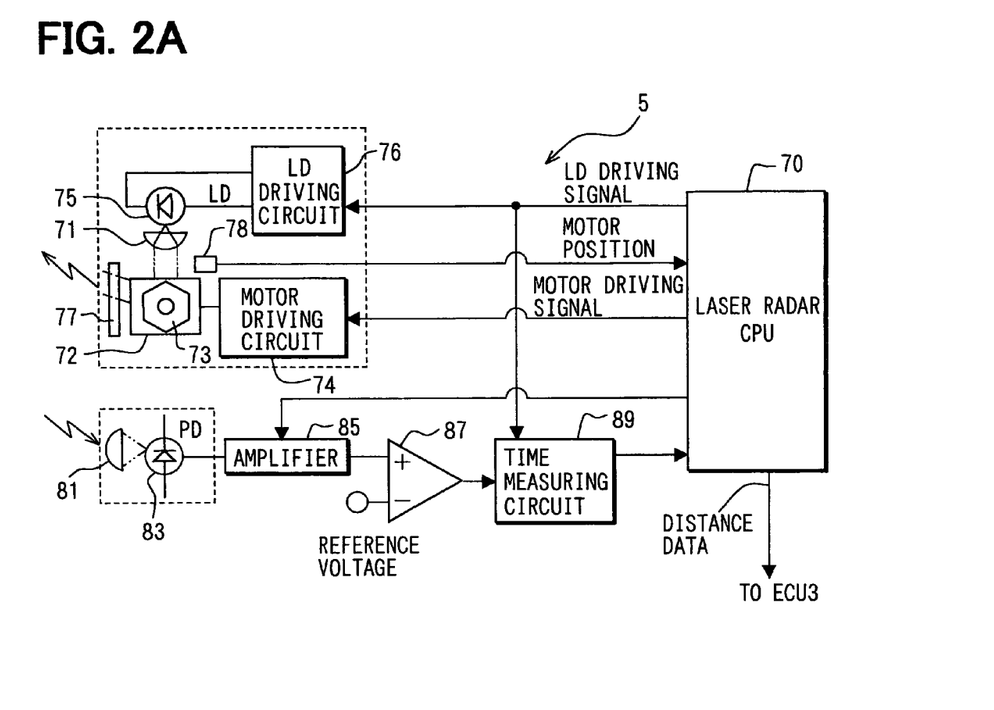
FIG. 2A shows a block diagram of a laser radar sensor.

As shown in FIG. 2, the laser radar sensor 5 is constructed generally with a light-emitting unit, a light-receiving unit and a laser radar CPU 70. That is, the laser radar sensor 5 includes the laser radar CPU 70 for calculating a distance to a reflector on a forward vehicle, horizontal and vertical positions of the reflector on the vehicle based on a detection result of the light-receiving unit beside having the light-emitting/receiving units.

The light-emitting unit includes a semiconductor laser diode 75 which radiates a pulse-like laser beam through a light-emitting lens 71, a scanner 72 and a glass plate 77. The laser diode 75 is connected to the laser radar CPU 70 through a laser diode driving circuit 76, and radiates (emits) a laser beam in response to a drive signal from the laser radar CPU 70. The scanner 72 includes a polygonal mirror 73 that rotates about a vertical axis. When the drive signal from the laser radar CPU 70 is input through a motor driving circuit 74, the polygonal mirror 73 is rotated by the driving force of a motor that is not shown. The rotational position of the motor is detected by a motor rotational position sensor 78, and is output to the laser radar CPU 70.

The polygonal mirror 73 of the embodiment has six mirrors with different plane tilting angles, and is capable of producing a laser beam so as to discretely scan over ranges of predetermined angles in the lateral and vertical directions, that is, in the direction of vehicle width and in the direction of vehicle height. The laser beam is thus scanned in a two-dimensional manner.

The light-receiving unit of the laser radar sensor 5 includes a focusing lens 81 for focusing the laser beam reflected by an object that is not shown, and a light-receiving element (photo detector PD) 83 that produces a voltage corresponding to the intensity of the reflected light that is focused. The voltage produced by the light-receiving element 83 is amplified through an amplifier 85, and is input to a comparator 87. The comparator 87 compares the voltage of the amplifier 85 with a reference voltage to output a received light signal to a time measuring circuit 89.

Figure 2B:
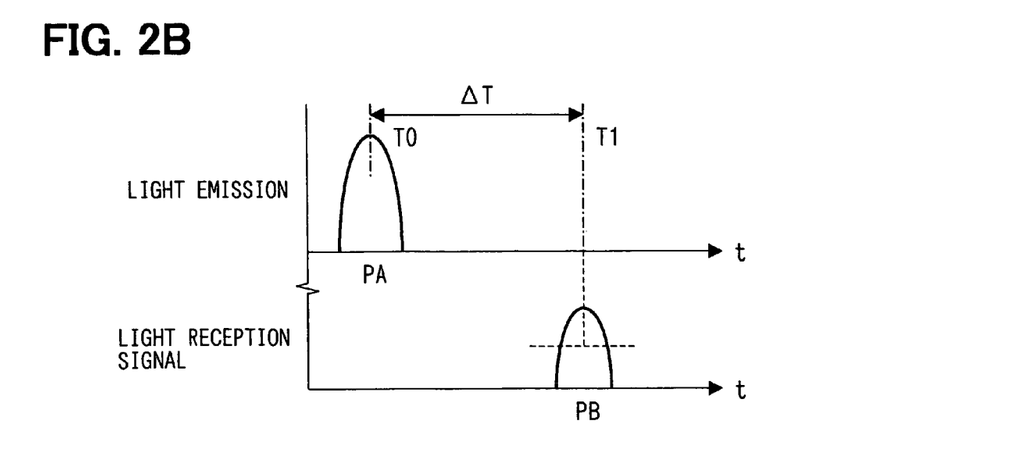
FIG. 2B shows a time chart for illustrating a method for distance detection by the laser radar sensor.

The time measuring circuit 89 also receives a drive signal for the laser diode driving circuit 76 from the laser radar CPU 70. The drive signal is converted to a start pulse PA and a stop pulse PB. The difference of the phase between the two pulses PA and PB, that is, the difference of time ΔT between the time T0 (laser beam emission) and the time T1 (laser beam reception), is digitally put into a binary code. The pulse width of the stop pulse PB is also measured as a length of time to be put into a binary code. Then, these binary codes are sent to the laser radar CPU 70.

A measurable area by the laser beam and a measurement area actually used for recognition of the forward vehicle or the like is described with reference to FIGS. 3 to 5.

Figure 3:
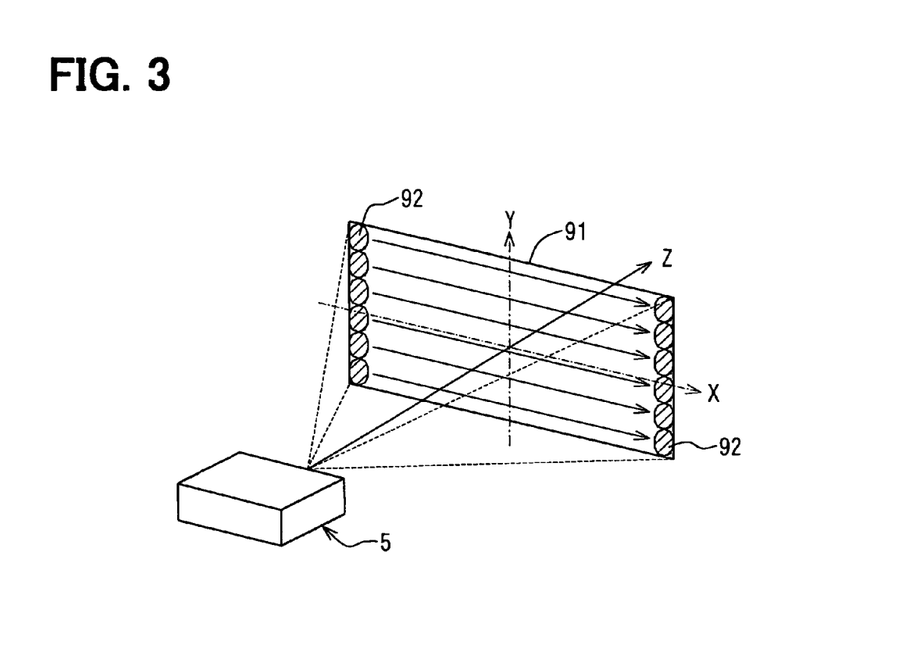
FIG. 3 shows a perspective view of a scanning area of the laser radar sensor.

FIG. 3 shows the measurable area 91 by the laser beam. In FIG. 3, a laser beam pattern 92 is only shown at right-most and left-most ends of the measurable area 91 (pattern 92 in between the two ends are omitted). The laser beam pattern 92 is shown as an ellipse in FIG. 3. However, the beam pattern is not necessarily limited to the ellipse. The beam pattern may be a rectangle or in other shapes. The laser radar sensor 5 discretely scans in the measurable area 91 on a plane defined by X and Y axes when Z axis perpendicular to XY plane is defined as a projection direction of the laser beam.

Figure 4:
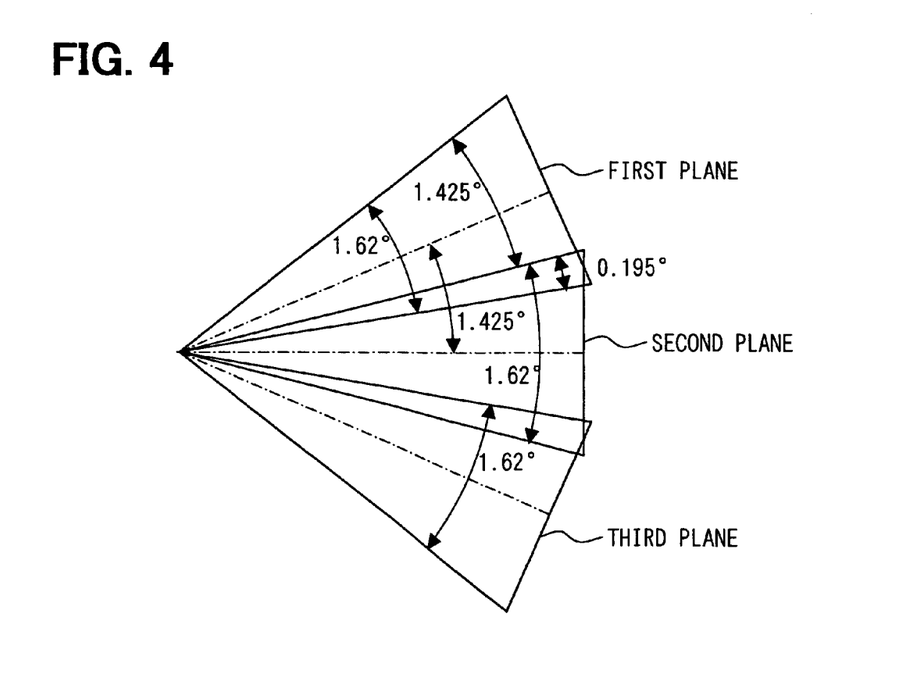
FIG. 4 shows an illustration of a laser beam angle of the laser radar sensor in Y axis direction and an overlapping area of adjacent laser beams.

FIG. 4 shows an illustration of a laser beam angle of the laser radar sensor 5 in vehicle height direction (Y axis direction). Two adjacent laser beams in Y direction are projected so that their edges partly overlaps each other. The beam angle of each of the laser beams in Y axis direction is 1.62 degrees. The overlapping portion of the beam angle is 0.195 degrees. Therefore, the beam angle that does not overlap with the adjacent beams is 1.23 degrees. The angle between axes of two adjacent beams is 1.425 degrees.

In this manner, resolution in Y axis direction is improved by partly overlapping two adjacent laser beams. That is, three planes of projected laser beams in FIG. 4, i.e., a first, second and third planes from top to bottom, creates five reflection patterns. The five patterns of reflection includes the reflection of the first plane of the laser beam, the reflection of the first and second planes, the reflection of the second plane, the reflection of the second and third planes, and the reflection of the third plane. The laser beam in the second plane can have an improved resolution because both ends of the laser beam in the second plane have overlapping areas of the adjacent laser beams in a width-decreasing manner.

The laser radar sensor 5 projects the laser beam in 501 steps in X axis direction by the beam step of 0.08 degrees, and projects 6 lines of laser beams in Y axis direction. Therefore, the measurable area 91 is defined as a ±20 degrees in X axis direction (0.08×501≅40), and 8.745 degrees in Y axis direction (1.62×6−0.195×5 (overlaps)=8.745). The laser beam scans the measurable area from left to right in X axis direction, and from top to bottom in Y axis direction in FIG. 3.

The laser radar sensor 5 projects the laser beam toward a measurement area that is narrower than the measurable area 91 defined in the above-described manner for recognition of the forward vehicle or the like. Provision of the measurement area makes disposition of the laser radar sensor 5 easier, and the measurable area 91 serves as an adjustment margin for shifting the measurement area when the axis of the laser beam projected from the laser radar sensor 5 is greatly deviated from a target angle (a reference angle) ΔA. The measurement area is so positioned that a strongest reflection of the laser beam generated by a predetermined target in both X and Y axis directions hits its center point. Japanese Patent Document JP-A-2004-184331 discloses and describes this method in detail.

The measurement area may also be defined by mechanically aligning the center of the measurable area 91 of the laser radar sensor 5 with a predetermined direction with the measurement area positioned at the center of the measurable area 91.

The measurement area is, for example, defined as an area of ±18 degrees (451 steps of the laser beam) in X axis direction and 4.47 degrees (3 lines of the laser beam) in Y axis direction. The axis of the center laser beam (second plane in FIG. 5) in Y axis direction is aligned with the reference angle ΔA either by mechanically adjusting the direction of the laser radar sensor 5 or by positioning the measurement area according to an installation position in the vehicle as shown in FIG. 5. For example, the axis of the second plane laser beam is directed below a horizontal level by providing the reference angle ΔA (e.g., 0.2 degrees) when the laser radar sensor 5 is disposed on a grille, and the axis is directed over the horizontal level by providing the reference angle ΔA (e.g., 0.5 degrees) when the laser radar sensor 5 is disposed on a bumper.

However, in some cases, the axis of the center laser beam in Y axis direction is not aligned with the reference angle ΔA because of the low resolution of the beam angle of the laser beam in Y axis direction (1.62 degrees). A deviation angle of the axis of the center laser beam from the reference angle ΔA is calculated as a vertical light axis angle. The calculation method of the deviation angle is briefly described here as it is already disclosed in Japanese Patent Document JP-A-2004-184331. The vertical light axis angle Δθelv is calculated as a deviation angle of the axis of the center laser beam in Y axis direction from the reference angle ΔA as shown in FIG. 5.

The target positioned at the center of X and Y axis directions of the measurement area is aimed by the center laser beam in Y axis direction and two adjacent laser beams after defining the measurement area to have the reflection from the target. The center laser beam in Y axis direction in FIG. 5 is the laser beam corresponding to the second plane, and the two adjacent laser beams are corresponding to the first and the third plane.

The reflection intensity of the two adjacent laser beams on both sides of the center laser beam in Y axis direction are measured. The deviation angle Δθelv of the axis of the center laser beam from the reference angle ΔA in Y axis direction is calculated based on the measurement of the reflection intensity. For example, the deviation angle of the axis of the center laser beam in Y axis direction from the reference angle ΔA is determined based on the difference of the reflection intensity of the two adjacent laser beams on both sides, the ratio of the reflection intensity or the like. The deviation angle calculated in this manner is stored in the a non-volatile memory as the vertical light axis angle Δθelv. Provision of the vertical light axis angle Δθelv improves the accuracy of recognition of an object such as the forward vehicle by the object recognition apparatus.

The laser radar CPU 70 outputs the drive signal to the light-emitting unit for two dimensional scanning of the measurement area when the laser radar sensor 5 is actually used for recognition of the object in front of a subject vehicle. The two dimensional scanning yields scan angles θx, θy as representation of scan direction and measurement of a distance r. Definition of the scan angles θx, θy are as follows. That is, a vertical scan angle θy is an angle between the projection of the laser beam on the YZ plane and the Z axis, and a horizontal scan angle θx is an angle between the projection of the laser beam on the XZ plane and the Z axis.

The laser radar CPU 70 calculates the distance to the object based on the difference of time ΔT between the two pulses PA and PB received from the time measuring circuit 89, and the distance and the corresponding scan angles θx and θy are used to generate the position data of the object. That is, an origin (0, 0, 0) of the coordinate is set to the center of the laser radar sensor 5, and the scan angles θx, θy and the distance r are converted to rectangular coordinates (X, Y, Z), where the X axis is a width direction of the vehicle, the Y axis is a height direction of the vehicle, and the Z axis is a forward direction of the subject vehicle. The rectangular coordinates (X, Y, Z) and the received beam intensity data (the pulse width of the stop pulse PB) are output to the recognition and vehicle distance control ECU 3 as distance data.

The recognition and vehicle distance control ECU 3 recognizes the object based on the distance data from the laser radar sensor 5, and controls the brake drive unit 19, throttle drive unit 21, and the automatic transmission controller 23 by sending the drive signals according to the condition of the forward vehicle derived from the recognized object. This control is a so-called vehicle distance control. An alarm determination process for issuing an alarm for the recognized object that stays in an alarm area for a predetermined duration is also conducted. In this case, the recognized object includes the forward vehicle or the like that is either traveling or stopping in front of the subject vehicle.

The internal construction of the recognition and vehicle distance control ECU 3 is briefly described as a control block. The distance data output from the laser radar sensor 5 are sent to an object recognition block 43. Based on the three-dimensional position data obtained as the distance data, the object recognition block 43 finds a central position (X, Y, Z) of the object, and a size (W, D, H) of the object such as width W, depth D and height H. Based on a change in the central position (X, Y, Z) with the passage of time, further, a relative speed (Vx, Vy, Vz) of the object is found with the position of the subject vehicle as a reference. The object recognition block 43 further determines whether the object is at rest or is moving based on the vehicle speed (speed of the subject vehicle) output from the vehicle speed calculation block 47 based on the value detected by the vehicle speed sensor 7 and upon the relative speed (Vx, Vy, Vz) found above. Based on the result of determination and the central position of the object, objects that affect the traveling of the subject vehicle are selected, and the distances to the selected objects are displayed on the distance display unit 15.

Further, a steering angle calculation block 49 finds a steering angle based on a signal from the steering sensor 27, and a yaw rate calculation block 51 calculates a yaw rate based upon a signal from the yaw rate sensor 28. Further, a curvature radius (radius of curvature) calculation block 57 calculates a radius of curve (radius of curvature) R based on the vehicle speed from the vehicle speed calculation block 47, the steering angle from the steering angle calculation block 49 and the yaw rate from the yaw rate calculation block 51. Then, the object recognition block 43 calculates a vehicle shape probability and a subject vehicle lane probability based on the curve radius R, the central position (X, Z) and the like. The vehicle shape probability and the subject vehicle lane probability are described later in detail.

In this manner, a "target model" is defined by the data described above. The data calculated in the object recognition block 43 is examined in a sensor error detection block 44.

When abnormality of the data is detected, the abnormal sensor display 17 informs a driver of data abnormality.

A preceding vehicle detection block 53 for determining the preceding vehicle selects the preceding vehicle based on a variety of data obtained from the object recognition block 43, and finds a distance Z to the preceding vehicle in the direction of Z axis and a relative speed Vz. Then, an inter-vehicle distance control and alarm decision block 55 for controlling the inter-vehicle distance and the alarm either determines whether an alarm be produced when it is the alarm determination or determines the content of vehicle speed control when it is the cruise determination, based on the distance Z to the preceding vehicle, relative speed Vz, preset state of the cruise control switch 26, state in which the brake switch 9 is depressed, opening degree from the throttle opening sensor 11 and a sensitivity setpoint value of an alarm sensitivity setting unit 25. When the alarm must be produced, an alarm generating signal is output to the alarm sound generator 13. When it is the cruise determination, control signals are sent to the automatic transmission control unit 23, to the brake drive unit 19 and to the throttle drive unit 21 to effect the required control operations. When these control operations are executed, required display signals are output to the distance display unit 15 to notify the conditions to the driver.

The inter-vehicle control and the alarm determination described above must be based on an appropriate object recognition, that is, based on an appropriately recognized vehicle as the object of recognition. Thus, the process of the object recognition in the object recognition block 43 of the recognition and vehicle distance control ECU 3 for appropriately recognizing the vehicle is described in the following part.

Figure 6A:
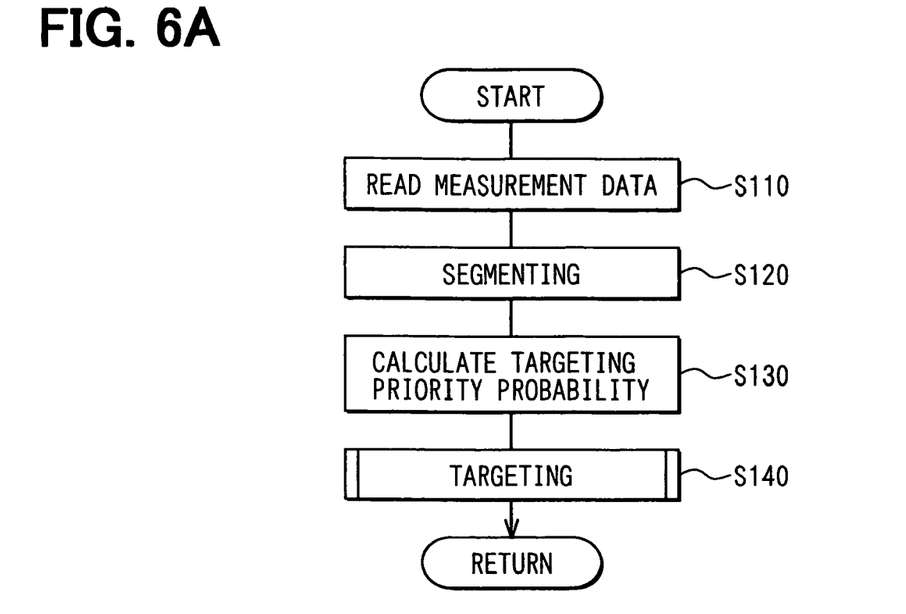
FIG. 6A shows a flowchart of an object recognition process.

FIG. 6A shows a flowchart of an object recognition process. In step S110, the object recognition process reads distance data of a single scan from the laser radar sensor 5. The interval of each scan is, for example, 100 milliseconds, that is, the laser radar sensor 5 provides the distance data to the process every 100 millisecond.

In step S120, data is segmented. As mentioned above, the three-dimensional positional data acquired as the distance data are grouped to form segments. For this segmenting, data satisfying a predetermined connection condition (unification condition) are corrected to produce one presegment data, and of the presegment data, data satisfying a predetermined connection condition (unification condition) are collected to produce one definitive segment data. For example, the presegment data is obtained in a manner such that, with respect to data point-recognized, the point sets are unified when satisfying two conditions that the distance $\Delta X$ in the X axis direction is below 0.2 m and the distance $\Delta Z$ in the Z axis direction is below 2 m. In this embodiment, there are three scanning lines in the Y axis direction and, through the presegmenting, the presegment data are produced for each line. Therefore, for definitive-segmenting, the presegment data close to each other in a three-dimensional (X, Y, Z) space are unified (definitive-segmenting). Each of the definitive segment data forms a rectangular parallelepiped region having three edges in parallel along the X axis, Y axis and Z axis, and the center coordinates (X, Y, Z) thereof and the lengths (W, H, D) of the three edges representative of the size are used as the data contents. Incidentally, unless otherwise specified particularly, the definitive segment (data) will be referred to simply as "segment (data)."

In step S130, each segment data is set as a pretarget, and with respect to each pretarget, a targeting priority probability, which is a probability of the object of targeting processing as a target model, is calculated. In this case, the target model is a model of an object to be produced with respect to a group of segments, and the pretarget is a candidate for a target model undergoing the targeting processing. In this embodiment, a maximum of 18 pretargets can be selected, and for the target model, of the pretargets, four pretargets are selected in the order of decreasing targeting priority probability.

As the decision factors, considering whether the vehicle shape probability falls below a predetermined probability (for example, 50%), whether it is a moving object, whether the lateral distance relative to this vehicle falls below a predetermined distance (for example, 6 m in each of right and left directions), whether the detection continues for a predetermined period of time, and the like, the targeting priority probability of each pretarget is calculated to become higher as the number of the applicable items increases.

A description will be given hereinbelow of the vehicle shape probability. In a case in which a large number of delineators are installed at a short interval along a roadside or when a guard rail is detected, there is a possibility that these stationary objects are recognized as a moving matter in error. This is because, when something is always detected at the same position, a decision is made that a vehicle running at the same speed as that of this vehicle exists at that position. Therefore, the vehicle shape probability is calculated in order to prevent an object recognized as a moving object in error from being judged as a preceding vehicle in error. In the preceding vehicle detection block 53, if a decision indicative of a roadside matter is made when the vehicle shape probability is below 50%, it is possible to prevent a repeatedly appearing stationary matter from being judged as a preceding vehicle in error.

The range the vehicle shape probability can take is from 0 to 100%, and for reducing the influence of instantaneous noise and dispersion, the vehicle shape probability is calculated through the weighted mean according to an equation (1)

$$\text{Present vehicle shape probability} = \text{Last value} \times \alpha + \text{Present instantaneous value} \times (1-\alpha) \quad \text{[Equation 1]}$$

The initial value is set at 50%, and $\alpha$ is set at, for example, 0.8. Moreover, the instantaneous value of the vehicle shape probability is calculated on the basis of the relative speed, the vertical and horizontal lengths D and W, the detection time, and the like. Incidentally, the method of calculating this vehicle shape probability is described in detail in Japanese Paten Laid-Open No. 2002-40139 (Paragraph No. 0045 to 0049), and the further description will be omitted for brevity.

In step S140, four pretargets having a higher targeting priority probability are selected as targets which, in turn, are subjected to the targeting processing. This targeting processing will be described hereinbelow with reference to a flowchart in FIG. 6B. In the targeting processing, first, a corresponding segment of a target model is retrieved (step S141). This is the processing for retrieving which of the currently detected segments the target model obtained previously agrees with, and the segment corresponding to the target model is defined as follows. First, assuming that the target model has moved from the position at the time of the last processing at the relative speed at the time of the last processing, a presumed position of the current target model is calculated. Subsequently, a presumed movement range having a predetermined width in each of the X axis, Y axis and Z axis directions is set around the presumed position. Moreover, a segment which is at least partially included in the presumed movement range is set as a corresponding segment.

Figure 6B:
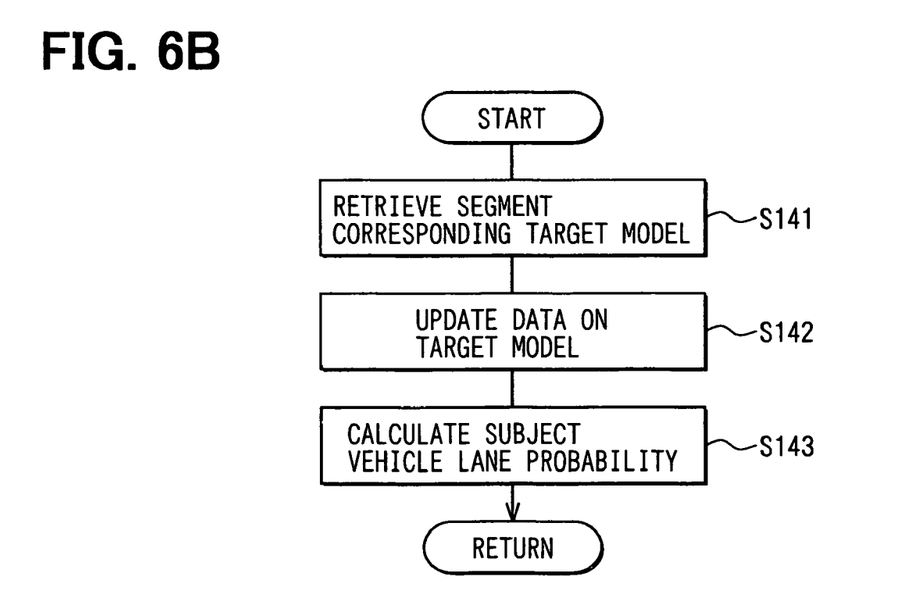
FIG. 6B shows a flowchart of an object determination routine in the object recognition process.

In step S142, the data updating processing is conducted with respect to the target mode. According to this processing, if there is a corresponding segment, the past data on the target model is updated on the basis of the present data, and the data to be updated are the center coordinates (X, Y, Z), the width W, the height H, the depth D, the relative speeds (Vx, Vy, Vz) in the X axis, Y axis and Z axis directions, the four-times central coordinates (X, Y, Z) data taken in the past, the subject vehicle lane probability, and the like. In this connection, if there is no corresponding segment, the data updating on the target model is not made, and a new target model is registered.

Then, in step S143, the subject vehicle lane probability is a parameter indicative of the degree of certainty that the target model is a vehicle running on the same lane as this vehicle. Concretely, the position of the target model is calculated and the calculated position is put on a subject vehicle lane probability map to obtain an instantaneous value of the subject vehicle lane probability of the target model. In this case, the subject vehicle lane probability map is a map in which a predetermined ranges (for example, 5 m in each of right and left directions and 100 m ahead) in front of this vehicle is divided into a plurality of regions and a probability is allocated to each region so that the probability becomes higher as the distance thereto becomes shorter or it becomes closer to the course of this vehicle.

After the calculation of the instantaneous value of the subject vehicle lane probability, the subject vehicle lane probability is obtained through the weighted mean according to the equation (2).

Subject vehicle lane probability= [Equation 2]

Last value of subject vehicle lane probability $\times \alpha$ +

Instantaneous value of subject vehicle lane probability $\times (1 - \alpha)$

In this case, $\alpha$ can be a constant value, or it can also be a value varying in accordance with the distance from the target model or a region in which the target model exists. Incidentally, the method of calculating the subject vehicle lane probability is described in detail in Japanese Paten Laid-Open No. 2002-40139 (Paragraph No. 0050 to 0056), and the further description will be omitted for simplicity.

The data on the target model, including the vehicle shape probability and the subject vehicle lane probability, is outputted from the object recognizing black 43 to the preceding vehicle detection block 53 in FIG. 1. The preceding vehicle detection block 53 makes a decision that, of the target models whose vehicle shape probability exceeds a predetermined threshold (for example, 50%) and whose subject vehicle lane probability exceeds a predetermined threshold (for example, 50%), the target model having the shortest distance Z is a preceding vehicle. This decision result is outputted to the inter-vehicle distance control and alarm generation determination block 55.

Next, a description is given hereinbelow of the calculation of the vertical light axis deviation angle of the laser radar sensor 5.

Even when a vertical light axis angle $\Delta\theta$elv that is a deviation angle of the optical-axis center of the laser radar sensor 5 from the reference angle $\Delta$A is calculated, the deviation angle of the center laser beam of the laser radar sensor 5 from the reference angle $\Delta$A in Y axis direction can change because the actual laser beam emission range varies due to various factors. For example, due to the loading state of the vehicle, the number of passengers, or the like, particularly, in the Y axis direction (vertical direction), the laser beam emission range can shift from the range set as the measurement area. Moreover, when the subject vehicle runs repeatedly, the mounting state of the laser radar sensor 5 on the vehicle can vary because of being affected by the running vibrations and the like.

In the embodiment of the present invention, the reflector disposed on the forward vehicle is used to determine to what extent the center laser beam of the laser radar sensor 5 is deviated from the reference angle $\Delta$A in Y axis direction. That is, the vertical light axis deviation angle $\theta$u is calculated.

In this manner, the actual deviation angle of the center laser beam of the laser radar sensor 5 from the reference angle $\Delta$A is compared with the vertical light axis angle $\Delta\theta$elv. When the actual deviation angle is different from the angle $\Delta\theta$elv, recognition accuracy of the forward vehicle is improved by conducting upward/downward determination (described later) based on the vertical light axis deviation angle $\theta$u.

Figure 7:
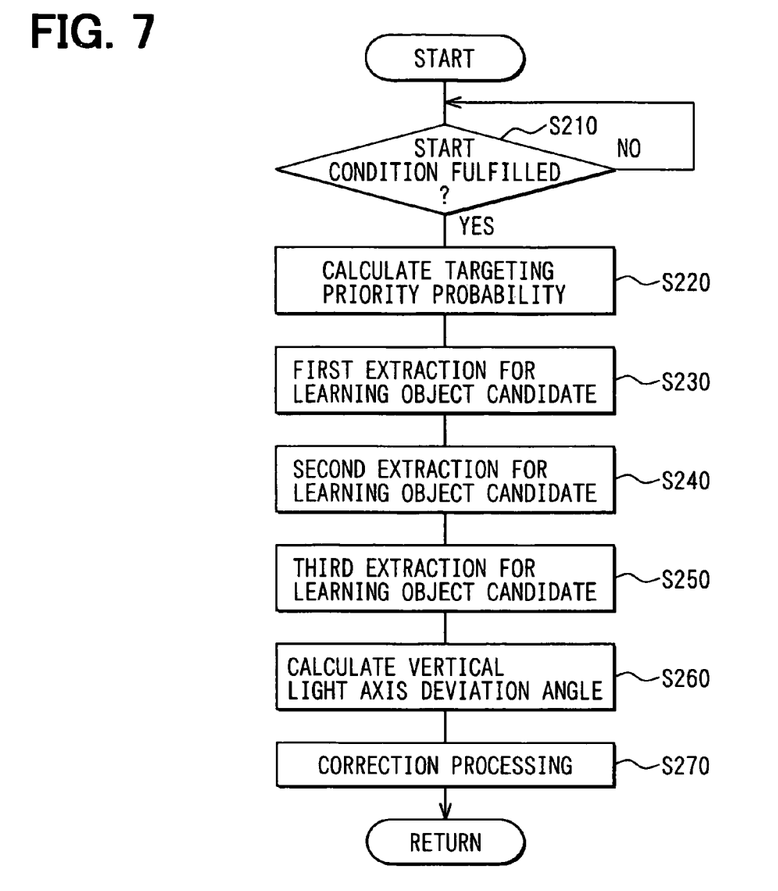
FIG. 7 shows a flowchart of calculation of the center laser beam of the laser radar.

FIG. 7 shows a flowchart of the calculation of the center laser beam of the laser radar sensor 5. In step S210, the process determines whether a start condition of calculation of the vertical light axis deviation angle $\theta$u is fulfilled. The start conditions are described in detail in the following.

A first start condition is that the subject vehicle is traveling at a speed greater than a predetermined value (for example, 40 km/h). This condition is imposed because the road that can be traveled at the speed faster than the predetermined value is free from unevenness and/or ups/downs that prevent a correct calculation of the vertical light axis deviation angle $\theta$u because of the difficulty of getting reflection from the reflectors of the preceding vehicle. In this case, the speed of the subject vehicle is derived from the vehicle speed calculation block 47.

A second start condition is that acceleration of the subject vehicle is smaller than a predetermined value, e.g., 0.05 G. This condition is imposed because the attitude of the vehicle is changed, that is, the subject vehicle is either nose-diving or squatting (nose-lifting) when acceleration value is greater than a predetermined value. In this manner, the vertical light axis deviation angle $\theta$u caused by a change of vehicle condition of stable nature such as a heavy load or an increase of occupants can be calculated. In this case, the acceleration can be calculated as a change in the vehicle speed.

A third start condition is that the curvature of the road where the subject vehicle is traveling is greater than a predetermined value, e.g., 1500 m. In this manner, erroneous calculation of the vertical light axis deviation angle $\theta$u because of the change of the attitude of the subject vehicle, that is, the changed direction of the laser beam of the laser radar sensor 5 caused by a roll of the subject vehicle while running a curved road, or loss of reflection of the laser beam from the forward vehicle, is prevented.

Further, the start condition may take other situations into account. That is, the calculation of the vertical light axis deviation angle may start only when light from the morning/evening sun directly incident on the laser radar sensor 5 is not causing sensor abnormality, or when sensing level of the laser radar sensor 5 is not deteriorated by dirt and/or other foreign matter attached on a surface of the sensor portion.

The process proceeds to step S220 when all of the above conditions are fulfilled. The process does not proceeds to step S220 when any of the above conditions are not fulfilled.

In step S220, targeting priority probabilities for a plurality of pretargets are calculated. This calculation is basically the same as the process described as step S130 of the flowchart in FIG. 6A.

In step S230, a first extraction is made with respect to a learning object candidates. In this first extraction, the pretarget is recognized as a moving object and the recognition continues over a predetermined period of time (for example, 10 seconds), and of the pretargets whose vehicle shape probability exceeds 50%, a pretarget having the highest targeting priority probability is determined as the learning object candidate.

In step S240, a second extraction is conducted. In this second extraction, with respect to the learning object candidate, a decision is made as to whether or not its width falls within a predetermined range (for example, a range under 3 m) for the learning object candidate extracted in the first extraction. In this manner, not only the passenger vehicles but also trucks and buses that are equipped with a reflector on the back are included as objects for the extraction.

The reflectors on both edges of the back of the vehicle have higher reflection rate of the laser beam compared with other part of the vehicle. An interval of the reflectors on both edges can be used as a criterion for determining that the moving object is a vehicle when the interval is within a predetermined range. The reflector disposed on a motorcycle may also be included as the learning object candidate.

In step S250, a third extraction is conducted. In this third extraction, the learning object candidate selected in the second extraction process is further determined by using a criterion that the distance Z from the learning object candidate is greater than a predetermined range.

As already described before, the laser beam radiated from the laser radar sensor 5 has the beam angle of 1.62 degrees in Y axis direction, and the beam angle of non-overlapping area with adjacent beams is 1.23 degrees. Therefore, the length of the cross-section of the laser beam in Y axis direction becomes greater in proportion to the distance from the source of the laser beam.

On the other hand, the height of the reflectors disposed on the vehicles varies according to the type and/or styling of the vehicle (for example, from 0.25 m to 1.5 m). Therefore, the vertical light axis deviation angle θu can be calculated regardless of the height of the reflector when the reflectors of various heights are covered by a single horizontal scan of the laser beam. In other words, the vertical light axis deviation angle θu cannot be accurately calculated when both of two different planes of the laser beams shown in FIG. 4 generate the reflection from the reflector.

Figure 8:
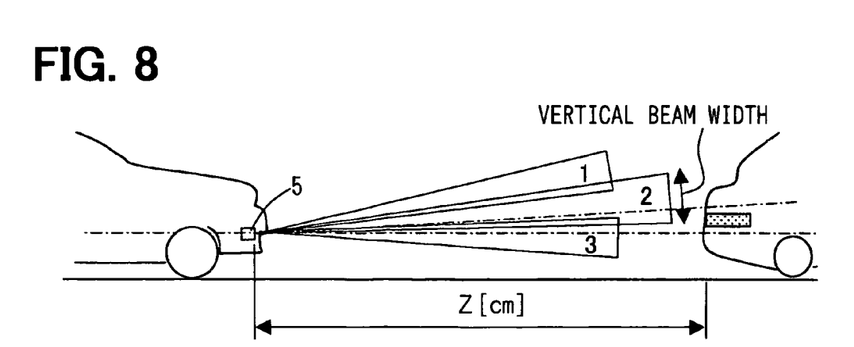
FIG. 8 shows an illustration of a relationship between a laser beam width and a distance Z.

In the present embodiment, the learning object candidate is selected by using a criterion that the distance Z of the learning object candidate is sufficient to have the laser beam width in Y axis direction that covers variations of the reflector disposition height as shown in FIG. 8. In this manner, various types of vehicles that have different reflector disposition height are accommodated as the learning object candidates for calculating the vertical light axis deviation angle θu. That is, opportunities of calculating the vertical light axis deviation angle θu is greatly increased.

The laser beam angle of non-overlapping area in the present embodiment is 1.23 degrees. Therefore, the width of the laser beam in Y axis direction extends to the length of 1.25 m (expected height variation of the reflectors according to the types of vehicles) when the distance Z from the subject vehicle to the reflector is about 58 m. That is, a minimum value of the distance Z is 58 m.

However, the minimum value of the distance Z may create a situation that a plurality of the laser beams (two adjacent laser beams in Y axis direction) yield the reflection on the same reflector depending on the disposition angle of the laser radar sensor 5. Therefore, the minimum value of the distance Z preferably includes a margin to be practically used for determination of the angle θu. The minimum value of the distance Z may be, for example, 80 m for sufficiently covering the variation of the reflector disposition height, because the laser beam having the non-overlapping angle of 1.23 degrees generates the vertical beam width of 1.72 m at the distance of 80 m. This width of the laser beam is sufficient for covering the expected variation of the reflector disposition height (1.25 m).

Then, the vehicle that fulfills all of the first to third start conditions described above is selected as the learning object candidate. The learning object candidate may be selected from a plurality of the candidates, or a vehicle having a representative reflector disposition height (i.e., 0.75 m for the passenger vehicle) may be selected as the learning object candidate based on the width of the vehicle.

In step S260, the learning object candidate selected above is used for calculation of a reflector detection face number Target_Face of the laser beam. The Target_Face, the reflector detection face number, is a face number of the laser beam that generated the reflection of the reflector disposed on the vehicle being selected as the learning object candidate. The reflector detection face number Target_Face is determined based on the reflection from the reflector, and the face number of the laser beam that generated the reflection.

In this case, an intermediate value is calculated as the reflector detection face number Target_Face by using Equation 3 when two laser beams jointly generate the reflection of the reflector.

$$\text{Target\_Face} = (\text{Upper laser beam face number} + \text{Lower laser beam face number})/2 \quad \text{[Equation 3]}$$

Figure 5:
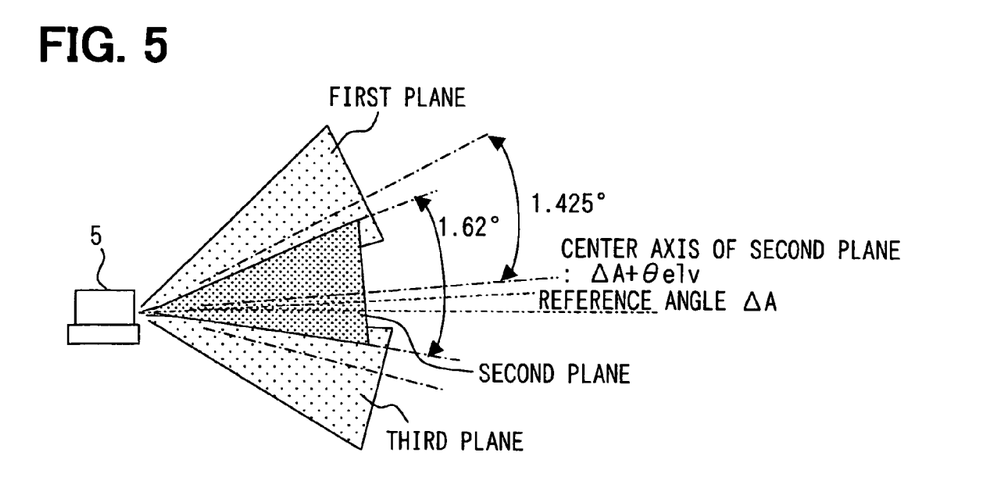
FIG. 5 shows an illustration of a disposition angle of the laser radar sensor on a vehicle.

For example, the reflector detection face number in FIG. 4 or 5 is one of 1 (upper face), 1.5 (upper and middle face), 2 (middle face), 2.5 (middle and lower face), and 3 (lower face).

In this manner, an instantaneous reflector detection face numbers are figured up along with incrementing the number of times N of calculation of the reflector detection face numbers by using Equations 4 and 5 in the following.

$$N = N+1 \quad \text{[Equation 4]}$$

$$\sum^{N} \text{Target\_Face} = \sum^{N} \text{Target\_Face} + \text{Target\_Face} \quad \text{[Equation 5]}$$

Then, an average of the reflector detection face numbers Target_Face ave is calculated when the number of times N reaches a predetermined number (e.g., N=600) by using Equation 6.

$$\text{Target\_Face } ave = \sum^{N} \text{Target\_Face} + N \quad \text{[Equation 6]}$$

The number of times of calculation N and the summation of the reflector detection face numbers Target_Face are initialized after calculation of the average of the reflector detection face number Target_Face ave.

In this manner, erroneous determination of the face number because of the environmental disturbance is prevented by calculating the average of the reflector detection face number Target_Face. Further, the initialization of the average of the reflector detection face number Target_Face is effective for correctly detecting current traveling condition of the vehicle.

Then, the vertical light axis deviation angle θu is calculated after calculation of the reflector detection face number Target_Face. The vertical light axis deviation angle θu is calculated by using Equation 7.

$$\theta u\ [LSB=0.01\text{deg}]=(\text{Target\_Face ave}-2)\times 1.425[\text{deg}]-\Delta A[\text{deg}][\quad\quad\text{Equation 7}]$$

The vertical light axis deviation angle θu shows the deviation angle of the center laser beam in Y axis direction from the reference angle ΔA. The vertical light axis deviation angle θu takes a positive value when the center axis is deviated upward from the reference angle ΔA, and the angle θu takes a negative value when the center axis is deviated downward.

In step S270, correction on the object recognition, or correction on the measurement area is conducted based on the vertical light axis deviation angle θu.

In terms of correction on the object recognition, laser radar sensor angle determination is conducted when the vertical light axis deviation angle θu is not within the range between a first standard range (for example, −0.8<θu<0.8). The result of the determination, that is, the disposition angle of the laser radar sensor has either an upward or downward deviation is provided to the object recognition block 43.

The object recognition block 43 sets the target priority probability of the learning object to, for example, 20% based on the determination of the vertical light axis deviation angle θu. That is, the learning object has higher probability of not being a vehicle when reflection of the learning object is created by the laser beam next to the center laser beam at a distance greater than a predetermined distance. In this manner, object recognition of the learning object is corrected.

For example, the laser beam lower in Y axis direction than the center laser beam has higher probability of being reflected by reflecting objects such as delineators (cats eyes) or the like on a road when the laser radar sensor 5 is disposed downwardly. The laser beam higher than the center laser beam has higher probability of being reflected by reflecting objects such as road signs or the like on a road when the laser radar sensor 5 is disposed upwardly. Therefore, the target priority probability of the learning object is decreased when a reflecting object is detected at a distance greater than a predetermined distance by the laser beam that is radiated either upward or downward relative to the center laser beam. In this manner, erroneous determination of non-vehicle as a vehicle is prevented.

Next, correction on the measurement area is described. The laser radar sensor 5 is controlled to have a reflector detection face number increased or decreased by 1 in Y axis direction when the vertical light axis deviation angle θu is greater than a second standard range (e.g., −1.2<θu<1.2) that is greater than the first standard range. That is, the center laser beam is changed either to an upwardly next laser beam or to a downwardly next laser beam. In this manner, the center laser beam axis is adjusted toward the reference angle ΔA in the measurable area 91.

Although the present invention has been fully described in connection with the preferred embodiment thereof with reference to the accompanying drawings, it is to be noted that various changes and modifications will become apparent to those skilled in the art.

For example, the distance Z and the scan angle θx, θy may be converted from the polar coordinate to the orthogonal coordinates in the object recognition block 43 instead of converting them in the laser radar sensor 5.

Such changes and modifications are to be understood as being within the scope of the present invention as defined by the appended claims.

What is claimed is:

1. An object recognition apparatus in a subject vehicle comprising:

a radar unit configured to transmit a plurality of laser beams in a scan range of a horizontal direction and vertical direction of the subject vehicle and receive a reflection of the plurality of laser beams by an object, the radar unit being included in the subject vehicle with a center axis of one of the plurality of the laser beams aligned with a target angle;

a recognition unit configured to recognize the object in front of the subject vehicle based on the reflection;

a determination sub-unit configured to determine positions of the plurality of the laser beams based on the reflection of the plurality of laser beams reflected by a reflector on the object in a condition for selecting the object by using first coverage in the vertical direction of the plurality of laser beams, the first coverage being sufficient for including variation of heights of the reflector on the object at a first distance detected by the radar unit as the condition for selecting the object, the determination sub-unit being included in the radar unit;

a calculation sub-unit configured to calculate a deviation angle of the center axis of the plurality of the laser beams from the target angle based on the positions of the plurality of laser beams determined by the determination sub-unit by using an average of a number of positions of the plurality of laser beams, wherein data of the number of positions being discarded when the deviation angle is calculated, the calculation sub-unit being included in the radar unit; and an adjustment sub-unit configured to control at least one of an adjustment of the center axis of the vertical scan range and an adjustment of the recognition of the object by the recognition unit, the adjustment sub-unit being included in the radar unit.

2. The object recognition apparatus according to claim 1, wherein the determination sub-unit uses second coverage in the vertical direction of each of the laser beams, the second coverage being sufficient for variation of heights of the reflector on the object at a second distance greater than the first distance as the condition for selecting the object.

3. An object recognition apparatus in a subject vehicle comprising:

a radar unit configured to transmit a plurality of laser beams in a scan range of a horizontal direction and vertical direction of the subject vehicle and receive a reflection of the plurality of laser beams by an object, the radar unit being included in the subject vehicle with a center axis of one of the plurality of the laser beams aligned with a target angle;

a recognition unit configured to recognize the object in front of the subject vehicle based on the reflection;

a determination sub-unit configured to determine positions of the plurality of the laser beams based on the reflection of the plurality of laser beams reflected by a reflector on the object in a condition for selecting the object by using coverage in the vertical direction of the plurality of laser beams, the coverage being sufficient for including variation of heights of the reflector on the object at a distance detected by the radar unit as the condition for selecting the object, the determination sub-unit being included in the radar unit;

a calculation sub-unit configured to calculate a deviation angle of the center axis of the plurality of the laser beams from the target angle based on the positions of the plurality of laser beams determined by the determination sub-unit, the calculation sub-unit being included in the radar unit; and an adjustment sub-unit configured to control at least one of an adjustment of the center axis of the vertical scan range and an adjustment of the recognition of the object by the recognition unit, the adjustment sub-unit being included in the radar unit, wherein the adjustment sub-unit determines a direction of the radar unit as one of an upward direction and a downward direction when the deviation angle is greater than a first range of the angle, and the recognition sub-unit decreases a probability of recognition of the object as a forward vehicle based on the reflection of a laser beam that is next to a center laser beam of the vertical scan range corresponding to the determination of the direction of the radar unit.

4. The object recognition apparatus according to claim 1, wherein two adjacent laser beams are projected in directions so that portions of the plurality of laser beams have an overlapping range, and the determination sub-unit determines an intermediate position of the two laser beams as the position of the laser beam when the two laser beams simultaneously generates the reflection of the reflector on the object.

5. The object recognition apparatus according to claim 4, wherein the first coverage in the vertical direction of the laser beam of the condition is defined by a width of a non-overlapping range of each of the laser beams in the vertical direction.

6. The object recognition apparatus according to claim 1 further including:

a speed detector configured to detect a speed of the subject vehicle, wherein the determination sub-unit determines the position of the laser beam generating the reflection of the reflector of the object when the speed of the subject vehicle is greater than a first value.

7. The object recognition apparatus according to claim 1 further including:

an acceleration detector configured to detect an acceleration of the subject vehicle, wherein the determination sub-unit determines the position of the laser beam generating the reflection of the reflector of the object when the speed of the subject vehicle is equal to or smaller than a first value.

8. The object recognition apparatus according to claim 1 further including:

a curvature detector configured to detect a curvature of a road being traveled by the subject vehicle, wherein the determination sub-unit determines the position of the laser beam generating the reflection of the reflector of the object when the curvature of the road is greater than a first value.

9. The object recognition apparatus according to claim 3, wherein a projection adjustment range of the laser beam from the radar unit in the vertical direction is wider than a total scan range of the laser beams, and the adjustment sub-unit shifts the total scan range of the plurality laser beams in the projection adjustment range when the deviation angle is not within a second range of the angle that is greater than the first range.

* * * * *

UNITED STATES PATENT AND TRADEMARK OFFICE
CERTIFICATE OF CORRECTION

PATENT NO. : 7,650,239 B2  Page 1 of 1
APPLICATION NO. : 11/273340
DATED : January 19, 2010
INVENTOR(S) : Samukawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Twenty-third Day of November, 2010

David J. Kappos
*Director of the United States Patent and Trademark Office*